March 17, 1953 H. A. CARTWRIGHT 2,631,893
UNIVERSAL VALVE FITTING FOR SPRAY BAR OUTLETS
Filed Dec. 11, 1950
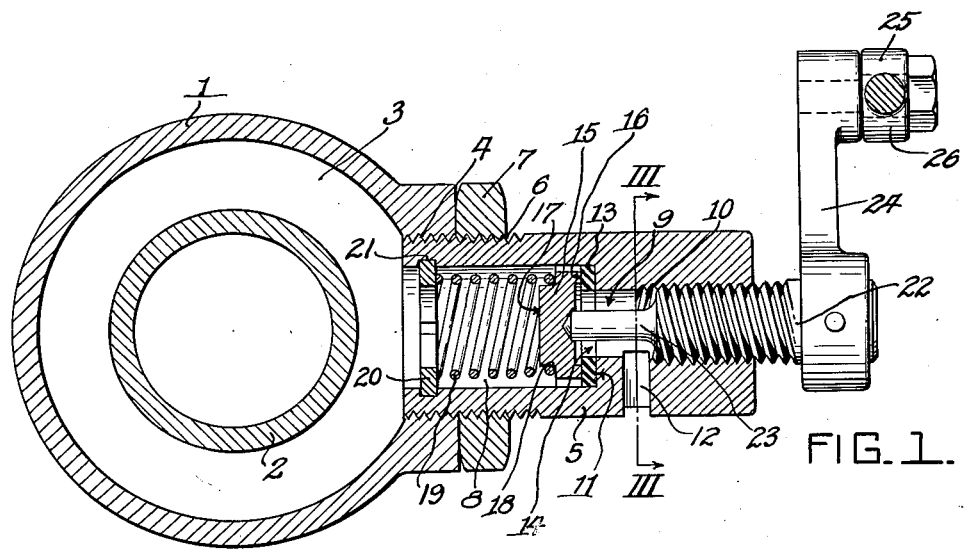
Fig. 1.
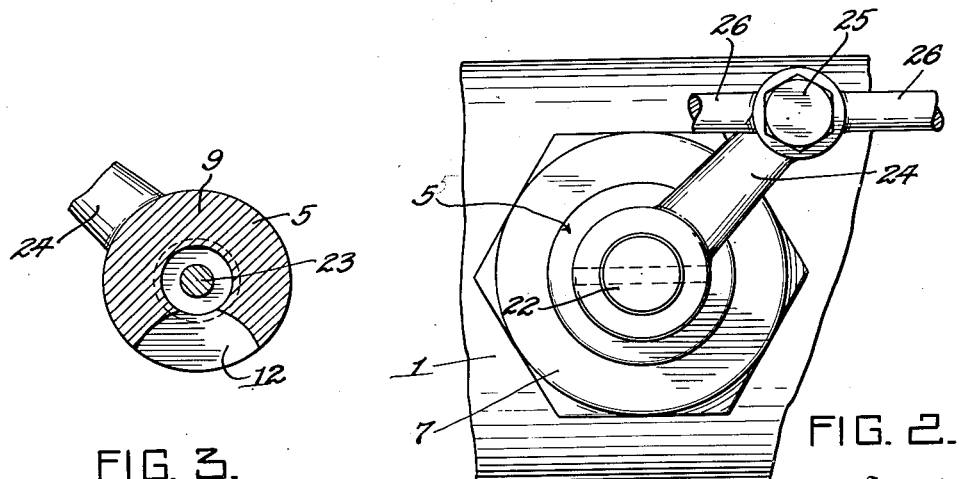
Fig. 3.
Fig. 2.
Inventor
H. A. Cartwright
By H. S. McDowell
Attorney Patented Mar. 17, 1953

2,631,893

UNITED STATES PATENT OFFICE 2,631,893

UNIVERSAL VALVE FITTING FOR SPRAY BAR OUTLETS

Horace A. Cartwright, Minneapolis, Minn.

Application December 11, 1950, Serial No. 200,197

1 Claim. (Cl. 299—150)

This invention relates to improvements in valve devices, and more particularly to an improved valve device for use in connection with apparatus for dispensing relatively heavy or viscous liquids. In one of its more specific aspects, the present invention is concerned with an improved valve device for use on spray bars of the type employed in connection with road vehicles for distributing asphalt, and other fluid bituminous compounds, on road surfaces and the like.

It is an object of the present invention to provide a valve device by means of which the flow of a liquid through an outlet port is subject to convenient, yet positive, regulation.

It is another object of the invention to provide a valve device having an outlet port which is normally closed by a spring-pressed disk member held against a seating gasket, and wherein a rotatable screw-threaded stem is provided in connection with the valve casing for unseating said disk member and holding the same open against spring pressure, whereby to admit of regulated fluid flow through the outlet port.

Another object of the invention is to provide a simple, inexpensive and positively operating valve mechanism capable of operating for prolonged periods of time without requiring mechanical servicing or part replacements and, further, to provide a valve device which when handling viscous fluids will not become clogged or obstructed with such fluids in a manner interfering with their proper flow through the device when desired.

For a further understanding of the invention, including additional objects and advantages thereof, reference is to be had to the following description and the accompanying drawings, wherein:

Fig. 1 is a vertical transverse sectional view taken through the spray bar of an asphalt spreader and disclosing the valve device of the present invention applied thereto;

Fig. 2 is a front elevational view of the valve device;

Fig. 3 is a vertical transverse sectional view on the line 3—3 of Fig. 1.

Referring more particularly to the drawings, the numeral 1 designates a pipe or manifold through which a fluidic material is passed for discharge. In this instance, the pipe or member 1 comprises a spray bar of a portable asphalt-distributing vehicle adapted for roadway operations. Within the spray bar there is arranged an internal pipe member 2, and fluid asphalt, or the like, usually in a heated state, is advanced under pressure through the pipe member in one direction, flowing from the pipe member into an annular space 3 for travel through the spray bar in an opposite direction to that of its initial flow. The spray bar is formed with a plurality of internally threaded openings 4, and received in these openings are the externally threaded inner ends of a plurality of valve housings or barrels 5.

Each of these barrels has its inner end externally threaded as at 6 for positioning in the threaded openings 4, and lock nuts 7 are arranged on the threads 6 for effecting positive retention of the barrels or housings 5 in their mounted positions. Formed in each of the housings or barrels is an axially disposed longitudinally extending valve chamber 8, which terminates rearwardly in a bore 9 of reduced diameter, the latter having axial alignment with the chamber 8, the bore 9 being internally threaded as at 10. Due to their differences in diameter, a shoulder 11 is formed at the meeting plane of the chamber 8 and the bore 9. Beyond this shoulder, the housing or barrel 5 is provided with an arcuate fluid-outlet slot 12. The latter communicates at its upper end with the bore 9 ahead of the threaded part 10 of said bore, and extends to the lower exterior of the barrel or housing to cause a downwardly diverging or fan-shaped distribution of fluids discharged from the valve through said slot.

Seated on the shoulder 11 is a gasket 13 having a central opening 14. Normally closing this opening is a valve disk or member 15 of rigid composition, the same being formed with an annular flange 16 which seats against one of the faces of the gasket 13. The opposite side of the valve disk or member is formed with a boss 17 which acts as a seat and guide for a coil spring 19. The coil spring seats against a split collar 20, which is positioned in a shallow circular groove 21 provided in the walls of the chamber 8 near its point of communication with the space 3.

By this construction, it will be noted that the operation of the spring 19 maintains the valve disk or member 15 in seated engagement with the gasket 13, thereby arresting flow of a liquid from the space 3 of the spray bar to the outlet slot 12 of the valve. However, to unseat the valve disk to admit of such flow, I employ an operating shaft or stem 22. This shaft is provided with an externally threaded shank which is received by the internal threads 10 of the bore 9. Further, the shaft includes an inner stem of reduced diameter, the latter having engagement with the center of the valve disk or member 15, so that when the shaft 22 is rotated in one direction, the pitch travel imparted thereto will be such as to operate the said disk or member 15, the stem engaging with the central depressed forward face of the associated valve disk or member 15, whereby upon rotation of the shaft 22, or partial rotation thereof, in one direction, sufficient longitudinal movement will be imparted to the shaft, due to the pitch of the shaft threads, to unseat the valve disk or member 15, thereby providing for flow of the fluidic material from the annular space 3 of the spray bar 1, through the valve chamber 8, around the circumference of the valve disk or member 15, thence between the valve disk or member 15 and the seating ring or gasket 13 into the smooth inner end of the bore 9 and thence through the segmental outlet slot or orifice 12.

It will be noted, by reference to Fig. 3, that the slot or orifice 12 flares outwardly and downwardly, so that the fluidic material passing under pressure therethrough conforms to the configuration of said slot to produce a relatively wide fan-like spread of the fluid on the underlying road surface. Further, the slot or orifice 12, by reason of the segmental form thereof, is self-cleaning under the flow of fluidic material therethrough, and is not likely to become clogged with obstructing deposits when the valve disk or member 15 is seated for some time and the fluidic material on the outlet side thereof allowed to cool.

The outer end of each of the shafts 22 carries a crank arm 24. To the upper end of this crank arm 24, there is pivotally connected as at 25 an operating bar or link 26. Usually this link is manually actuated by suitable means, not shown, to open and close simultaneously a plurality of the spray nozzles of the spray bar.

From the foregoing, it will be apparent that the present invention provides a spray nozzle which is particularly applicable to operations such as that encountered in the distribution on road surfaces of viscous fluidic materials, such as heated asphalt or other bituminous compound. The valve mechanism of each spray nozzle is direct and positive in its operation, both in the opening and closing thereof in providing for or stopping fluid flow. It will be observed that the flow of heated fluidic material handled by the apparatus is maintained to the valve disk or member 15. Thus the material which cools and sets on the discharge side of said disk or member will be capable of being readily removed, first, by reason of the shape of the unthreaded region of the bore 9 and the outwardly and downwardly flaring construction of the slot or orifice 12 and, second, by action of the pressure discharged fluidic material itself. The actuating portion of the spray nozzle, as represented by the shaft 22, is rotatable, and by the screw threaded construction, its action in unseating the valve disk or member 15 is rendered positive and easy to execute. Moreover, the screw threads on the shaft 22 serve to prevent the escape therethrough of the fluidic material, compelling such material to travel through the outlet slot or orifice 12.

I claim:

A combination valve and spray nozzle for spray bars comprising a cylindrical casing formed with an axially disposed valve chamber opening at one end of said casing in a fluid inlet, a cylindrical bore communicating with the opposite end of said chamber and forming a longitudinal continuation of said chamber, said bore being of lesser diameter than said chamber and being formed with an internal screw-threaded region, an annular shoulder formed on said casing between said chamber and said bore, and an arcuate slot intersecting said bore at right angles thereto and defining a spray outlet for said casing; a resiliently compressible annular gasket positioned in the chamber of said casing adjacent said shoulder; a cylindrical valve disk formed at one end with a relatively reduced area annular seating flange and positioned wholly within said valve chamber, said valve disk having a lesser diameter than said chamber but greater than said bore and being movable longitudinally of said chamber to engage or disengage the annular flange thereof with said gasket, and thereby to interrupt or establish communication between said chamber and said bore, said valve disk being formed on the flanged end thereof with a central recess; an annular collar carried in the chamber of said casing adjacent the inlet thereof; a coil compression spring positioned between said collar and said valve disk and arranged to urge said disk to a position engaging the annular flange thereof with said gasket; and a shaft extending through the end of said casing opposite said inlet and formed with an intermediate screw-threaded region threadedly engaged with the screw-threaded region of said bore, said shaft being formed at the inner end thereof with a relatively reduced diameter stem portion extending into said chamber and disposed in axial alignment and engagement with the central recess formed in said valve disk, said shaft being movable axially of said casing upon rotation to move said valve disk to a position disengaging the annular flange thereof from said gasket and in opposition to said spring.

HORACE A. CARTWRIGHT.

REFERENCES CITED

The following references are of record in the file of this patent:

UNITED STATES PATENTS

| Number | Name | Date |
|---|---|---|
| 988,175 | Cumley | Mar. 28, 1911 |
| 1,945,637 | Hernandez | Feb. 6, 1934 |
| 2,046,373 | Etnyre | July 7, 1936 |

FOREIGN PATENTS

| Number | Country | Date |
|---|---|---|
| 13,482 | Great Britain | Dec. 11, 1913 |
| 263,756 | Italy | Mar. 28, 1929 |
| 910,095 | France | Dec. 19, 1940 |